United States Patent
Harte et al.

(10) Patent No.: US 11,722,958 B2
(45) Date of Patent: Aug. 8, 2023

(54) WI-FI ADAPTIVE BEACON SKIPPING FOR BATTERY-POWERED DEVICES

(71) Applicant: Google LLC, Mountain View, CA (US)

(72) Inventors: Howard M. Harte, Dublin, CA (US); Haidong Wang, Sunnyvale, CA (US); Feng Wang, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 133 days.

(21) Appl. No.: 17/308,886

(22) Filed: May 5, 2021

(65) Prior Publication Data
US 2021/0368441 A1 Nov. 25, 2021

Related U.S. Application Data

(60) Provisional application No. 63/029,315, filed on May 22, 2020.

(51) Int. Cl.
*H04W 52/02* (2009.01)
*H04W 84/12* (2009.01)

(52) U.S. Cl.
CPC ........ *H04W 52/0229* (2013.01); *H04W 84/12* (2013.01)

(58) Field of Classification Search
CPC ............. H04W 52/0229; H04W 84/12; H04W 52/0251; H04W 52/0216
See application file for complete search history.

(56) References Cited

U.S. PATENT DOCUMENTS

| | | | |
|---|---|---|---|
| 2007/0211745 A1* | 9/2007 | Deshpande | H04L 12/18 370/535 |
| 2008/0002692 A1* | 1/2008 | Meylan | H04W 72/30 370/390 |
| 2014/0036746 A1* | 2/2014 | Mann | H04W 76/28 370/311 |
| 2015/0098374 A1 | 4/2015 | Homchauydhuri et al. | |
| 2017/0201940 A1 | 7/2017 | Koratekere et al. | |
| 2020/0103951 A1 | 4/2020 | Gossain et al. | |

FOREIGN PATENT DOCUMENTS

WO 2018187969 10/2018

OTHER PUBLICATIONS

"Extended European Search Report", EP Application No. 21171604.8, dated Sep. 30, 2021, 11 pages.
"WirelessHD Specification Overview", Aug. 2009, 77 pages.

* cited by examiner

*Primary Examiner* — Mohammad S Anwar
(74) *Attorney, Agent, or Firm* — Colby Nipper PLLC

(57) ABSTRACT

A Wi-Fi chip is configured to operate in a power saving Wi-Fi mode in which the Wi-Fi chip repeatedly checks, at a first time interval, periodic DTIM beacons transmitted at a second time interval by a wireless access point of a Wi-Fi network, wherein the first time interval is longer than the second time interval. Upon receiving a standby message, the Wi-Fi chip, during a predefined time duration, operates in a standby mode in which the Wi-Fi chip checks at a third time interval periodic DTIM beacons transmitted by the wireless access point, wherein the third time interval is shorter than the first time interval.

20 Claims, 4 Drawing Sheets

WI-FI ADAPTIVE BEACON SKIPPING FOR BATTERY-POWERED DEVICES

BACKGROUND

A wireless local area network (WLAN) access point (AP) may synchronize traffic across a network by transmitting beacons to network-connected devices. Beacons periodically include delivery traffic indication messages (referred to as DTIM beacons), which inform network-connected devices about the presence of buffered data at the access point. When a network-connected device receives a DTIM beacon, the network-connected device may fetch the buffered data.

In order to receive a DTIM beacon, a network-connected device powers up wireless communication circuitry when the DTIM beacon is expected to be received. For intervals during which DTIM beacons are not expected to be received, and during which no data is being transferred between the access point and a network-connected device, the network-connected device may enter a low power mode (e.g., a sleep mode), during which the communication circuitry may be powered down or kept in a low-power state.

In some scenarios, a network-connected device (especially one powered by batteries) may be configured to conserve even more power by periodically skipping DTIM beacons and remaining in the low power mode. Such a device may keep its wireless communication circuitry powered down while skipping DTIM beacons, thereby conserving power. However, the power savings achieved by skipping the reception of DTIM beacons comes at the cost of added latency, since the communication circuitry wakes less frequently to check for traffic.

SUMMARY

This disclosure describes systems and methods for adaptively skipping the reception of DTIM beacons in order to more effectively balance power conservation with latency. Such systems and methods adaptively adjust the rate at which a battery-powered, network-connected device powers on communication circuitry in order to receive a DTIM beacon. Further, these rate adjustments may be based on anticipated interactions with the battery-powered device. When such an interaction is anticipated (e.g., a user accesses an application associated with the battery-powered device), the battery-powered device receives DTIM beacons at an increased rate. As a result, when the anticipated interaction is subsequently performed (e.g., the user requests, using the accessed application, access to a video stream provided at the battery-powered device), the battery-powered device can respond to the interaction (e.g., provide the requested video data) more quickly.

In one aspect, a Wi-Fi transceiver (Wi-Fi chip, Wi-Fi integrated circuit) is configured to operate in a power saving Wi-Fi mode in which the Wi-Fi transceiver repeatedly checks, at a first time interval, periodic DTIM beacons transmitted at a second time interval by a wireless access point of a Wi-Fi network, wherein the first time interval is longer than the second time interval. Upon receiving a standby message, the Wi-Fi transceiver, during a predefined time duration, operates in a standby mode in which the Wi-Fi transceiver checks at a third time interval periodic DTIM beacons transmitted by the wireless access point, wherein the third time interval is shorter than the first time interval. A device including at least one corresponding Wi-Fi transceiver and switching from operation in a power saving Wi-Fi mode to a standby mode may therefore also be provided.

In another aspect, a client device, prior to receiving a user request for video and/or audio data from a battery-powered camera device including a Wi-Fi transceiver, detects a first interaction with an application of the client device, the application configured to communicate with the battery-powered camera device via a Wi-Fi network, and in response to the detected first interaction, transmits an indication of the detected first interaction to a server system in communication with the battery-powered camera device, the indication configured to cause the server system to transmit a standby command causing the Wi-Fi transceiver of the battery-powered camera device to receive DTIM beacons at an increased rate compared to a rate associated with a sleep mode of the Wi-Fi transceiver. The client device receives the user request for video and/or audio data from the battery-powered camera device, transmits the user request to the server system, and receives the video and/or audio data from the server system.

Thus, systems, methods and devices are provided for adaptively adjusting the rate at which battery-powered devices skip DTIM beacons, thereby enabling increased power savings and decreased latency.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Battery-powered devices may conserve energy by entering a low-power state during which various components are powered down or left in a low-power state. While in such a low-power state (also referred to as power saving Wi-Fi mode or sleep mode herein), wireless communication circuitry may be powered down as well, causing beacons (including DTIM beacons) transmitted by a wireless local area network (WLAN, Wi-Fi) access point (AP) to be ignored. A battery-powered device may be configured to wake from the low-power state to periodically receive DTIM beacons. DTIM beacons that were transmitted by the access point while a battery-powered device is in a low-power state can be referred to as having been skipped. The following disclosure describes systems and methods for adaptively adjusting the rate at which battery-powered devices, with power-saving modes wake to receive, and/or stay asleep to skip reception of, DTIM beacons.

Figure 1:
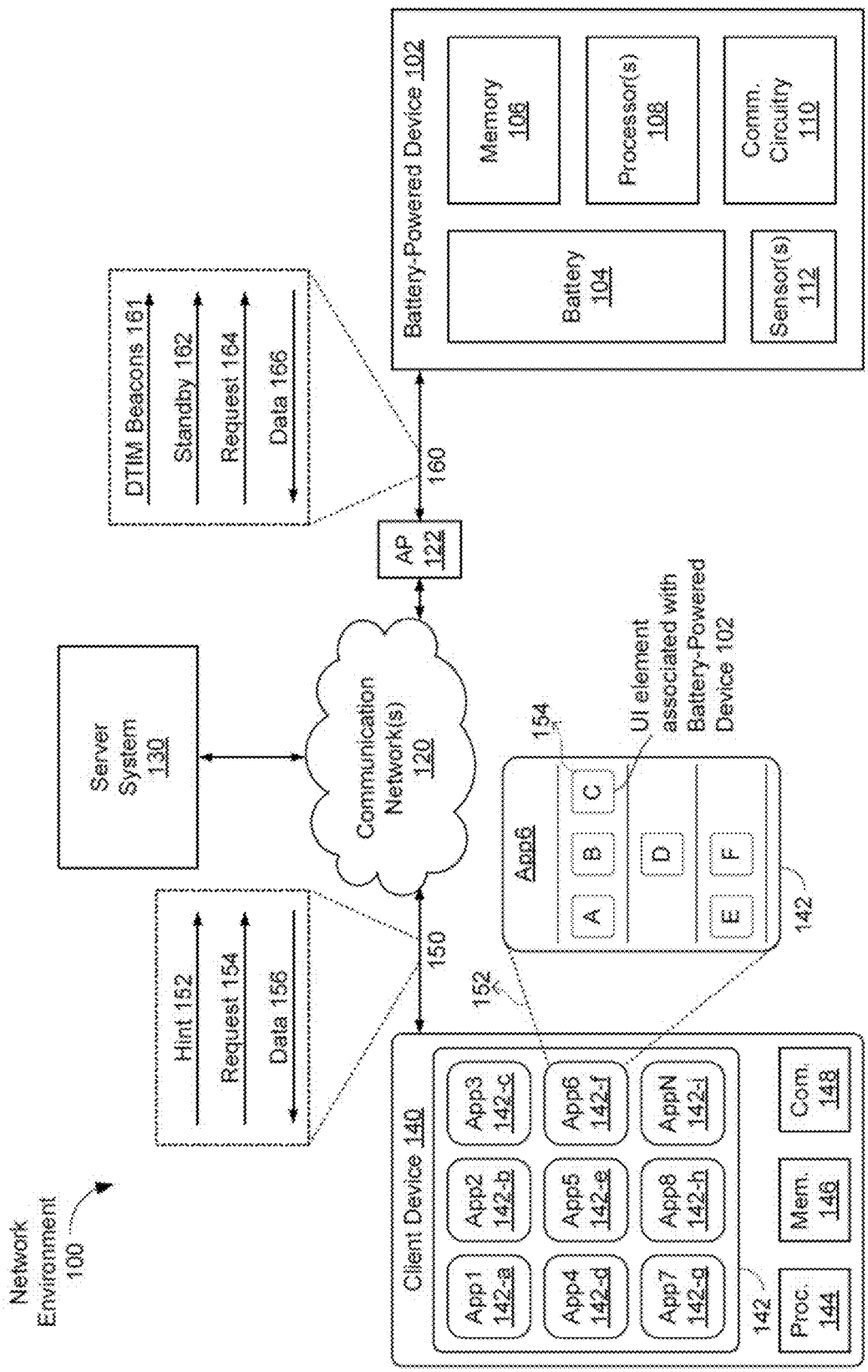
FIG. 1 is a diagram of a network environment including a battery-powered device configured to adaptively skip DTIM beacons in accordance with some implementations.

FIG. 1 is a diagram of a network environment 100 in accordance with some implementations. The network environment 100 includes a battery-powered device 102, one or more communication networks 120, an access point (AP) 122, a server system 130, and a client device 140.

The battery-powered device 102 may be any electronic device configured for wireless network communication and powered by one or more batteries 104. An example battery-powered device 102 is a camera device (e.g., a security camera, a doorbell camera, a light, or any other battery-powered device including a camera configured to record and/or stream video and/or audio data). The battery-powered device 102 includes memory 106 storing programs that, when executed by processor(s) 108, perform one or more of the functions described below with reference to FIGS. 2A-2E and 3. In some implementations, the memory 106 is a non-transitory computer-readable storage medium. The processor(s) 108 are configured to execute the programs stored in the memory 106. The battery-powered device 102 includes communication circuitry 110. For example, the communication circuitry 110 can be a Wi-Fi chip (also referred to as a Wi-Fi transceiver, a Wi-Fi system-on-chip, a Wi-Fi module, or a wireless communication module) including one or more radios, a controller, and other circuitry configured to provide network connectivity for the battery-powered device 102 (e.g., transmit and receive wireless communications to and from communication network(s) 120). The communication circuitry 110 is configured to send and receive communications 160 (e.g., 162, 164, and 166 as described in more detail below) to and from other network devices via the communication network(s) 120. In some implementations, the battery-powered device 102 includes one or more sensors 112. For implementations in which the battery-powered device 102 is a camera device, the sensor(s) 112 include an image sensor, and the processor(s) 108 are configured to process (e.g., record and compress) image data recorded by the image sensor.

The communication network(s) 120 comprise one or more wide area networks such as the Internet. The communication network(s) 120 are in communication with a wireless access point 122 (e.g., a WLAN router) configured to route communications to and from the battery-powered device 102 via a wireless local area network such as a network implementing the IEEE 802.11 standard (a Wi-Fi network), in particular the IEEE 802.11 standard of 1997 and any later version such as 802.11b, 802.11g, 802.11n, 802.11ac, 802.11ax, and 802.11ad. The communication network(s) 120 and access point 122 facilitate transmissions of data packets between the battery-powered device 102 and other devices connected to the network, such as a server system 130 and a client device 140. In some implementations, the access point 122 is communicatively coupled to the battery-powered device 102, and the access point 122 is configured to buffer data addressed to the battery-powered device 102 while the battery-powered device 102 is in a low power state. In some implementations, the access point 122 is configured to synchronize the local network including the battery-powered device 102 by transmitting beacons (including DTIM beacons 161) to network-connected devices according to the IEEE 802.11 standard.

The server system 130 comprises one or more servers in communication with the communication network(s) 120. In some implementations, the server system 130 receives messages, commands, and other types of data from a client device 140, processes the received data, and transmits messages, commands, and other types of data to the battery-powered device 102 via the communication network(s) 120. The server system 130 may also receive data (e.g., video and/or audio data) from the battery-powered device 102, process and/or store the received data, and transmit the received data to a client device 140 via the communication network(s) 120. In some implementations, the server system 130 executes an Internet service that enables users of client devices 140 to program, interact with, and review information from network-connected, battery-powered devices 102.

The client device 140 may be an electronic device configured for wired or wireless network communication via communication network(s) 120. For example, the client devices 140 may be a mobile device (smartphone), a laptop/desktop/tablet computer, an electronic assistant device (speaker assistant, display assistant), or any other device used by a user to interact with other devices connected to communication network(s) 120. The client device 140 includes a processor 144 and memory 146 storing programs that, when executed by the processor 144, perform one or more of the functions described below with reference to FIGS. 2C-2E and 3. The client device 140 includes communication circuitry 148 for transmitting and receiving communications 150 (e.g., 152, 154, and 156 as described in more detail below) to and from other network devices via the communication network(s) 120. In some implementations, the client device 140 includes a user interface (UI) module 142 configured to accept user inputs (e.g., a touch screen or a microphone) and display outputs (e.g., a display or a speaker).

In some implementations, the UI module 142 displays one or more affordances 142*a-i*, each of which is associated with a respective application App1-N stored in the memory 146 and executable by the processor 144. Alternatively, the UI module 142 does not display the affordances 142*a-i*, but accepts vocal commands for executing or otherwise interacting with the applications APP1-N. An example application (App6, accessed by selection of affordance 142-*f* or by voice command) is associated with the battery-powered device 102. Specifically, the application associated with the battery-powered device 102 is configured to facilitate user interactions with the battery-powered device 102. For example, if the battery-powered device 102 is a camera device, the application (App6) displays (or otherwise makes available to a user) controls for interacting with the camera device, such as controls for requesting a live video stream, interacting with camera-based functions (e.g., recording and playback), and so forth. In some implementations, the application associated with the battery-powered device 102 (App6) is associated with a plurality of network-connected devices, and a user interface of the application (e.g., displayed or otherwise made available to a user via UI module 142) provides affordances or other kinds of UI elements for interacting with respective network-connected devices. For example, element C may be associated with the battery-powered device 102, while elements A, B, D, E, and F may be associated with other network-connected devices. Continuing with this example, elements A-C may be associated with devices in one room of a home, element D may be associated with a device in another room of the home, and elements E and F may be associated with devices in yet another room of the home. Upon selection of element C, the application (App6) displays (or otherwise makes available) UI elements for interacting with the battery-powered device 102.

DTIM Beacon Skipping and Standby Scenarios

FIGS. 2A-2E are diagrams depicting DTIM beacon skipping scenarios, including various standby modes, in accordance with some implementations. As described above, a battery-powered device 102 may conserve battery power by skipping DTIM beacons in order to leave communication circuitry 110 disabled for longer periods of time (e.g., in a low-power state or completely powered down). However, while the communication circuitry 110 is disabled, the battery-powered device 102 cannot receive communications from other network-connected devices, thereby adding latency. As such, there is a tradeoff between the power savings afforded by skipping DTIM beacons and the latency added due to the communication circuitry 110 being disabled.

The Wi-Fi operations described in FIGS. 2A-2E are implemented by communication circuitry 110 (e.g., a Wi-Fi chip) of the battery-powered device 102. For example, in a low-power mode/power saving Wi-Fi mode 202, the battery-powered device 102 may be in a sleep state, during which the communication circuitry 110 is powered on to received DTIM beacons and is otherwise disabled to conserve power. Independently of the communication circuitry 110, other components of the battery-powered device 102 may be powered off (or in a low-power state) to conserve power. In fact, the communication circuitry 110 may perform DTIM beacon checking operations independently of other components of the battery-powered device 102 (e.g., processor(s) 108 and sensor(s) 112), and as a result, such components may remain powered down even while the communication circuitry 110 powers up to check for DTIM beacons. In FIGS. 2A-2E, received DTIM beacons are depicted by solid lines, while skipped DTIM beacons are depicted by dotted lines.

The Wi-Fi operations described in FIGS. 2A-2E may be programmed into the communication circuitry 110 (e.g., programmed into the Wi-Fi chip) and executed in response to receipt of a particular standby command or message (162, FIG. 1) sent by an Internet service provided by the server system 130 (as described in more detail below). Specifically, the operations that are performed by the communication circuitry 110 (e.g., the Wi-Fi chip) include DTIM beacon checking operations, operations that are in response to receipt of a standby command or message (described in more detail below), operations causing the communication circuitry 110 to revert to a low-power mode (if no buffered data is available at the access point), and operations causing other components of the battery-powered device 102 to transition to a full power state (if buffered data is available at the access point).

Figure 2A:
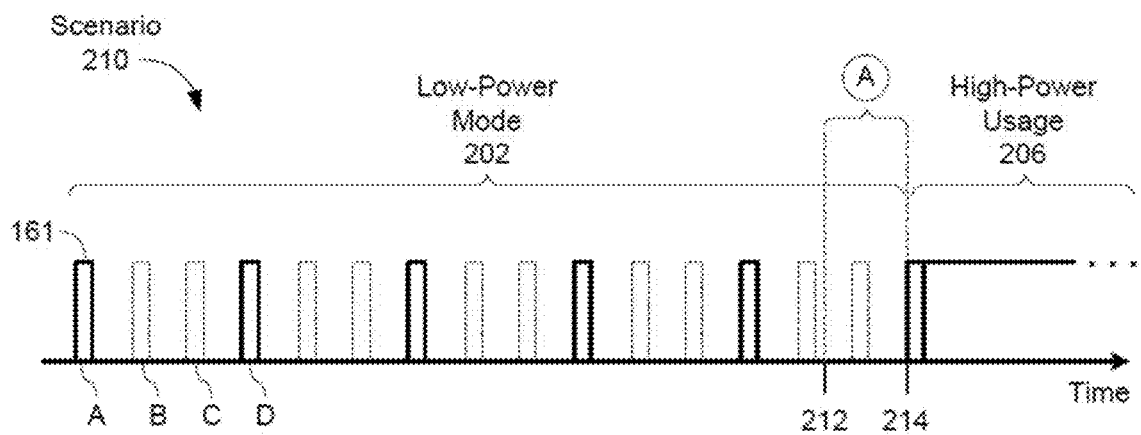
FIGS. 2A-2E are diagrams depicting DTIM beacon skipping scenarios in accordance with some implementations.

FIG. 2A depicts a scenario 210 in which a battery-powered device 102 periodically receives DTIM beacons 161 (e.g., at times A and D) while skipping other DTIM beacons (e.g., at times B and C) while in a low-power mode 202. Stated another way, communication circuitry 110 of the battery-powered device 102 wakes up to receive DTIM beacons at regular intervals, i.e., first time intervals. The intervals at which the battery-powered device 102 receives DTIM beacons may be an integer multiple of the DTIM beacon period (the period at which an access point emits DTIM beacons). For example, an access point may be configured to emit DTIM beacons every 200 milliseconds (the time period between A and B in FIG. 2A, also referred to as second time interval herein). However, a battery-powered device 102, while in a low-power mode 202, may be configured to receive every third DTIM beacon (receiving DTIM beacons every 600 milliseconds, the time period between A and D in FIG. 2A) while skipping two out of every three DTIM beacons emitted by the access point. The DTIM beacon receiving intervals and skipping rates described in these examples are for illustrative purposes and are not meant to be limiting. For example, communication circuitry 110 of a battery-powered device 102 may be configured to wake up and receive every second, third, fourth, fifth (and so forth) DTIM beacon emitted by an access point while in a low-power mode. For example, if a battery-powered device 102 is configured to receive every fifth DTIM beacon emitted by an access point with a DTIM beacon rate of 200 milliseconds, then the battery-powered device 102 would receive DTIM beacons once per second.

If the access point receives (and buffers) data addressed to the battery-powered device 102 at time 212, the battery-powered device 102 does not receive any indications of the availability of that data until the next DTIM beacon is received at time 214. This delay, between (i) the time data is available at the access point for transfer to the battery-powered device 102 (time 212), and (ii) the time the battery-powered device 102 receives an indication that the buffered data is available (time 214) is referred to as Delay A. Once the battery-powered device 102 receives the DTIM beacon indicating availability of data at time 214, the battery-powered device 102 fetches the buffered data from the access point and enters a high-power usage mode 206, defined as a state in which components (e.g., processor(s) 108, communication circuitry 110, and sensor(s) 112) of the battery-powered device 102 are powered up in order to perform operations. For example, data received by the access point at time 212 includes a request by a client device 140 to access a live video and/or audio feed from the battery-powered device 102 (in this case, a battery-powered camera device). The battery-powered device 102 receives this request after time 214 (after fetching the buffered data indicated by the DTIM beacon received at time 214 as being available). In response to the request, the battery-powered device 102 powers on its camera and streaming circuitry (e.g., enters high-power usage mode 206), obtains the requested video and/or audio data, and streams the data to the client device 140 via communication network(s) 120.

Figure 2B:
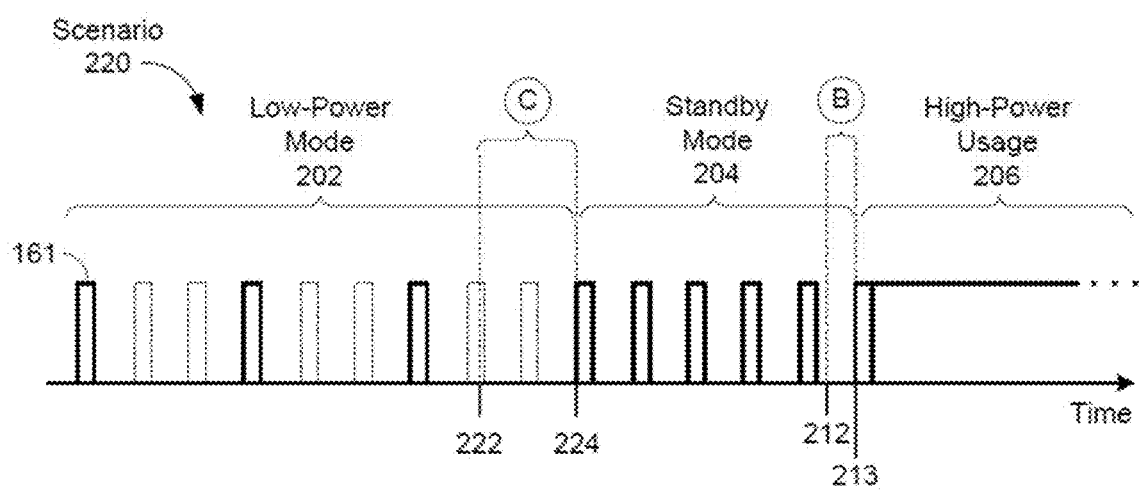

FIG. 2B depicts a scenario 220 in which a battery-powered device 102 periodically receives DTIM beacons 161 while skipping other DTIM beacons as described above with reference to the low-power mode 202 of scenario 210. However, in scenario 220, the access point receives a standby message/command (162 in FIG. 1) addressed to the battery-powered device 102 at time 222. Availability of this standby command is signaled to the battery-powered device 102 (via the access point) when the battery-powered device 102 receives the next DTIM beacon at time 224. In response to receiving the standby command, the battery-powered device 102 enters a standby mode 204, during which the battery-powered device 102 ceases skipping DTIM beacons (or skips them at a lower frequency). Accordingly, the battery-powered device 102 is operated—for a predefined (standby) time interval—in a standby mode in which the battery-powered device 102 checks at a third time interval periodic DTIM beacons transmitted by the wireless access point, the third time interval being shorter than the first time interval. As a result, when data addressed to the battery-powered device 102 is received at the access point at time 212, availability of this data is signaled to the battery-powered device 102 upon receiving the next DTIM beacon at time 213. The delay between (i) the time (the buffered) data is available at the access point for transfer to the battery-powered device 102 (time 212), and (ii) the time the battery-powered device 102 receives an indication that the data is available (time 213) is referred to as Delay B. Compared to Delay A in scenario 210, Delay B is lower. This lower delay enables the battery-powered device 102 to receive messages, and as an extension, to respond to any requests in the received messages, with lower latency. To be clear, time 212 in scenario 210 is the same as time 212 in scenario 220, but a DTIM beacon signaling the availability of buffered data at the access point can be received at an earlier time in scenario 220 (time 213) than in scenario 210 (time 214) due to the standby mode 204 causing the communication circuitry 110 of the battery-powered device 102 to receive DTIM beacons at an increased frequency.

Continuing the example described with reference to scenario 210 above, in which the battery-powered device 102 is a camera device, and the message received by the access point includes a request for live video and/or audio data, the battery-powered device 102 receives the request at an earlier time 213 (vs. 214 in scenario 210). As a result, the battery-powered device 102 can enter the high-power usage mode 206 and provide the requested video and/or audio data to the client device 140 with lower latency as compared to scenario 210.

In scenario 220, the access point receives the standby command while the battery-powered device 102 is still in a low-power mode 202. As such, there is a delay between (i) the time the standby command is received at the access point (time 222), and (ii) the time the battery-powered device 102 receives the standby command (time 224). This delay is referred to as Delay C. As a result of this delay, the earlier the standby command is received at the access point, the more likely the battery-powered device 102 will enter the standby mode 204 in time for subsequent messages to be signaled to the battery-powered device 102 with the lower Delay B (compared to Delay A).

The examples described above refer to the battery-powered device 102 as being a camera device, and the message received at the access point at time 212 as a request to obtain video and/or audio data. These examples are for illustrative purposes and are not meant to be limiting. For example, any network-connected, battery-powered device 102 may implement the low-power mode 202 and standby mode 204 (as well as standby modes 205 and 207 described below) upon receipt of a standby command. Specifically, a battery-powered device 102 may be in a power-saving sleep state during low-power mode 202, and the message received at time 212 may be any command requiring the battery-powered device 102 to wake from the sleep state.

Figure 2C:
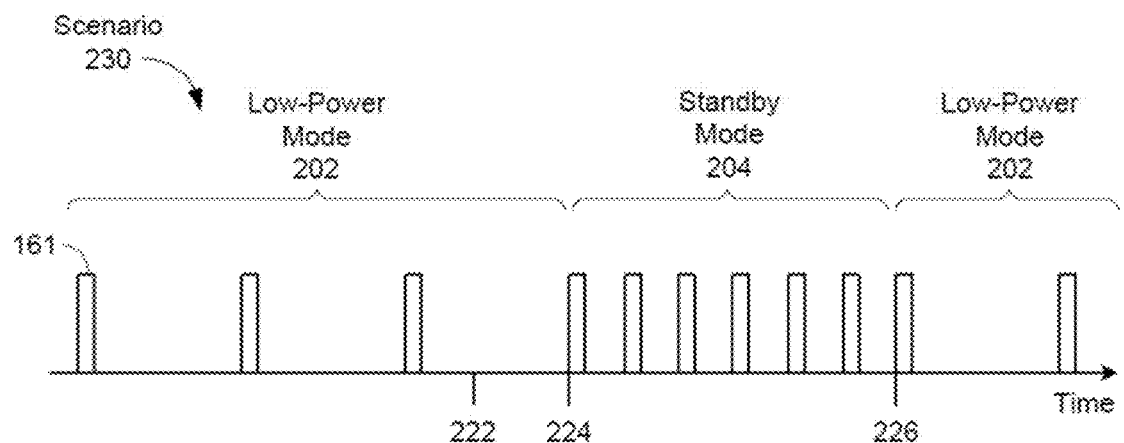
Figure 2D:
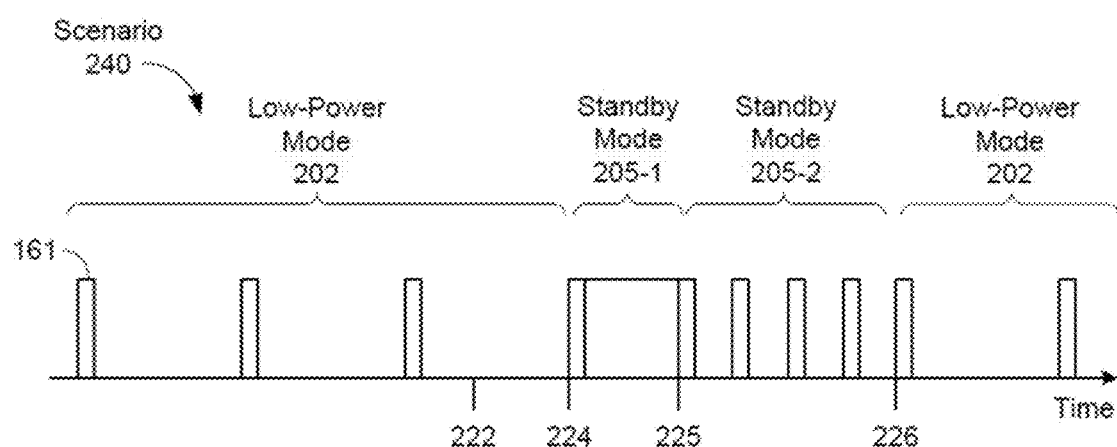
Figure 2E:
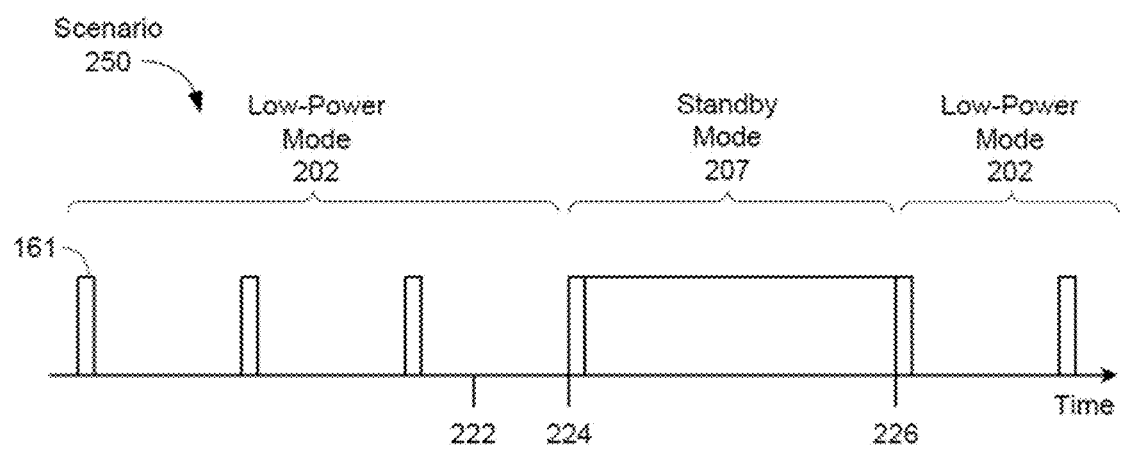

FIGS. 2C-2E depict additional scenarios for implementing a standby mode during which DTIM beacons are received at a higher frequency (or in other words, are skipped less frequently). Features shared with FIGS. 2A-2B are similarly numbered, and some are not further discussed for purposes of brevity. In addition, skipped DTIM beacons are no longer depicted in these scenarios in order to shift focus to other aspects of each scenario (nevertheless, DTIM beacons still regularly emanate from the access point as described above).

FIG. 2C depicts a scenario 230 in which a battery-powered device 102 periodically receives DTIM beacons 161 in a low-power mode 202. The access point receives a standby command at time 222 and the battery-powered device 102 enters a standby mode 204 as described with reference to scenario 220 (FIG. 2B) above. However, in this scenario, a subsequent message is not received at the access point. Therefore, in some implementations, the standby mode 204 expires (at time 226) and the battery-powered device 102 reverts to the low-power mode 202 in order to conserve power. The standby mode 204 expires at the end of a timeout period, which may be specified by the standby command itself, or may be predetermined independently of the standby command. Stated another way, the duration of the standby mode may be a predefined value associated with a timeout period of the particular standby mode (e.g., 204, 205, or 207 as described in more detail below). The timeout period may be programmed into the communication circuitry 110 (e.g., programmed into a Wi-Fi chip of the battery-powered device 102). The timeout period may be a fixed or variable period of time chosen to balance (i) the need for a particular standby mode to be long enough to accommodate subsequent messages that are expected to be received at the access point, with (ii) the need for the particular standby mode to be short enough to not significantly impact battery life of the one or more batteries 104 of the battery-powered device 102. The standby mode may last 30 seconds. Other durations may be implemented (e.g., any duration as short as 1 second (or shorter) or as long as 60 seconds (or longer).

FIG. 2D depicts a scenario 240 in which a battery-powered device 102 periodically receives DTIM beacons 161 in a low-power mode 202. The access point receives a standby command at time 222 and the battery-powered device 102 enters a standby mode 205 comprising two phases. During a first phase, 205-1, the battery-powered device 102 powers on additional components (e.g., wakes up or comes out of a sleep state) such that messages received at the access point may be fetched by the battery-powered device 102 without having to wait for a DTIM beacon (without the data being buffered by the access point). For example, the battery-powered device 102 may fetch data buffered at the access point and signaled by beacons transmitted between DTIM beacons, which has the potential to reduce latency even more than the reduced latency potential of standby mode 204 in scenarios 220 and 230 (FIGS. 2B and 2C). Since the first phase 205-1 of standby mode 205 requires additional power consumption (due to, for example, the communication circuitry 110 being constantly powered on), this phase may expire before the overall standby mode expires. For example, the first phase 205-1 expires at time 225, and the battery-powered device 102 may enter a second phase 205-2 of the standby mode during which DTIM beacons are checked at an increased frequency (corresponding to standby mode 204 described above), yet the communication circuitry 110 may be powered down between DTIM beacons, thereby providing reduced delays (Delay B as described above) while not causing power to be drained at a level required by keeping the communication circuitry 110 powered on during the first phase 205-1 of standby mode 205. The second phase 205-2 ends at the expiration of the timeout period at time 226. The first phase 205-1 may last for the first 2 seconds of a 30 second standby mode, and the second phase 205-2 may last for the final 28 seconds of a 30 second standby mode. Other durations may be implemented (e.g., a first duration 205-1 lasting as short as 1 second (or shorter) or as long as 60 seconds (or longer), and/or a second duration 205-2 lasting as short as 1 second (or shorter) or as long as 60 seconds (or longer)).

FIG. 2E depicts a scenario 250 in which a battery-powered device 102 periodically receives DTIM beacons 161 in a low-power mode 202. The access point receives a standby command at time 222 and the battery-powered device 102 enters a standby mode 207, during which the battery-powered device 102 operates as described with reference to the first phase 205-1 of the standby mode 205 described above until the expiration of the timeout period at time 226. Compared to the other standby modes described above, standby mode 207 causes the highest power consumption but results in the lowest latencies.

For each of the scenario described in FIGS. 2C-2E, if a subsequent message addressed to the battery-powered device 102 is received at the access point during the standby mode, the battery-powered device 102 enters a high-power usage state 206, as described with reference to scenarios 210 and 220 (FIGS. 2A-2B), in order to process any commands included in the message.

Even though the standby modes (204, 205, 207) described above may cause communication circuitry 110 of the battery-powered device 102 to be powered on more frequently, the standby modes do not necessarily require the battery-powered device 102 to power on other non-communication components (such as image processing components for a camera device). Therefore, even when a battery-powered device 102 is in a standby mode, the battery-powered device 102 may still conserve power by remaining in a power-saving mode (a sleep state), even if communication circuitry 110 periodically awakes to receive DTIM beacons.

As described above with reference to Delay C (FIG. 2B), the earlier the standby command is received at the access point, the more likely the battery-powered device 102 will enter the standby mode (204, 205, or 207) in time to receive a DTIM beacon signaling a subsequent message with reduced delay (Delay B). In some implementations, the standby command is triggered by a preliminary user interaction with a client device 140.

Referring to FIG. 1, for example, a user may open an application (App6) associated with the battery-powered device 102 (and, optionally, associated with other battery-powered devices connected to the network). While selecting affordance 142-*f* causes the application to open (or otherwise display UI options or make UI options available for facilitating interactions between the user and the application), the application may not yet be in a state that allows the user to directly interact with the battery-powered device 102. Even so, it can be inferred that since the user opened the application App6, there is a likelihood that the user may subsequently wish to interact with the battery-powered device 102 (e.g., by selecting affordance C). As such, the opening of the application triggers a hint message 152 to be sent form the client device 140 to the server system 130. The hint message can be sent by the application (App6) or by system software of the client device 140. Alternatively, the server system 130 can detect the opening of the app and send the standby command without receiving a hint message before.

In response to receiving the hint message, the server system 130 sends the standby command 162 to the battery-powered device 102 (and, optionally, to other devices connected to the same network as well). When the user proceeds to interact with the device (e.g., by selecting affordance C in a UI of the application), the client device 140 transmits a request message 154 to the server system 130, which causes a corresponding request message 164, to be transmitted to the battery-powered device 102. In response to the request message 164 being received by the battery-powered device 102 (after having been signaled by a DTIM beacon and fetched by the battery-powered device 102), the battery-powered device 102 may respond by transmitting requested data 166 to the server system 130, which forwards the data 156 corresponding to the requested data 166, to the client device 140. The standby command 162 in this example corresponds to the standby command received at time 222 in FIGS. 2B-2E, the request 164 corresponds to the subsequent message received at the access point at time 212 in FIGS. 2A-2B, and the data 166 corresponds to data transmitted by the battery-powered device 102 while in the high-power usage mode 206 in FIGS. 2A-2B. The request 154/164 may be a message requesting video and/or audio data (e.g., a live video stream), and the data 156/166 may include the requested data (e.g., the requested live video stream).

In the example described above with reference to FIG. 1, the hint message 152 is triggered when a user opens an application that includes options for interacting with the battery-powered device 102. This example is for illustrative purposes and is not meant to be limiting. In general, the hint message 152 may be triggered by any user interaction with the client device 140 that implies subsequent interactions with the client device 140 may cause the client device 140 to request that the battery-powered device 102 perform an operation requiring the battery-powered device 102 to come out of a power-saving mode (e.g., to wake from a sleep mode). Stated another way, the hint message 152 may be triggered by a user interaction that is an intermediate step in requesting data from the battery-powered device 102 (e.g., video and/or audio data), the intermediate step not including the actual request for the data. The detected user interaction (the intermediate step) is an indication that a user command for interacting with the battery-powered device 102 is imminent (likely to happen within a relatively small amount of time; e.g., 30 seconds). Example hint triggers include opening the application App6 (by selecting affordance 142-*f*), unlocking or turning on the client device 140 in response to a notification associated with the battery-powered device 102, or performing any other interactions involving the application App6 that do not necessarily cause data (messages or commands) to be sent to the battery-powered device 102 but are usually precursors to such data being transmitted.

In some implementations, the hint message 152 may be triggered by network-connected devices other than the client device 140. For example, if the battery-powered device 102 is a security camera, the hint message 152 may be triggered by a network-connected security device detecting a security event (e.g., unauthorized motion or access to a restricted area). In such cases, the security event triggers the hint message 152, which causes the battery-powered device 102 (the security camera) to enter a standby mode, so that subsequent requests for live video from the battery-powered device 102 may be received with reduced latency. As another example, the hint message 152 may be triggered by a network-connected hazard detection device, such as a smoke detector, detecting a hazard event (e.g., smoke or another hazardous substance above a threshold). In such cases, the hazard event triggers the hint message 152, which causes the battery-powered device 102 to enter a standby mode, so that subsequent requests for live video from the battery-powered device 102 may be received with reduced latency. In general, the hint message 152 may be triggered by any network-connected device upon an event is likely to cause a client device 140 to request that the battery-powered device 102 perform an operation requiring the battery-powered device 102 to come out of a power-saving mode (e.g., to wake from a sleep mode).

DTIM Beacon Skipping and Standby Process

Figure 3:
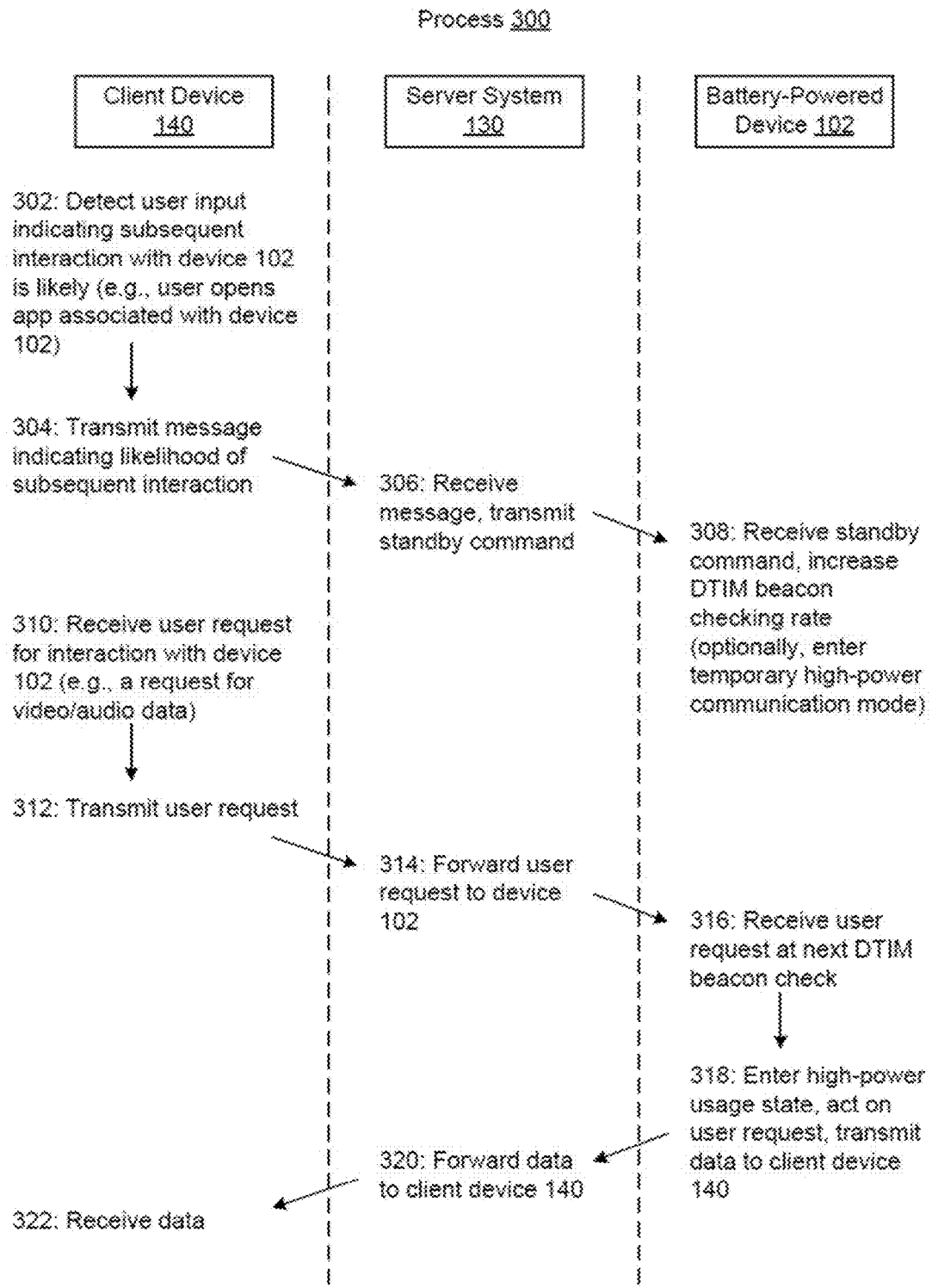
FIG. 3 is a flowchart of an example process for adaptively adjusting the rate at which DTIM beacons are skipped in accordance with some implementations Like reference numerals refer to corresponding parts throughout the several views of the drawings.

FIG. 3 is a flow diagram illustrating an example process 300 for adaptively adjusting the rate at which DTIM beacons are skipped in accordance with some implementations. The process 300 is, optionally, governed by instructions that are stored in a computer memory or non-transitory computer readable storage medium of each of a client device 140, server system 130, and battery-powered device 102, and that are executed by one or more processors of the client device 140, server system 130, and battery-powered device 102. Each respective computer readable storage medium may include a magnetic or optical disk storage device, solid state storage devices such as Flash memory, or other non-volatile memory device or devices. The respective instructions stored on each computer readable storage medium may include one or more of: source code, assembly language code, object code, or other instruction format that is interpreted by one or more processors. Some operations in process 300 may be combined, skipped, and/or the order of some operations may be changed.

A client device 140 detects (302) a user input indicating subsequent interaction with a battery-powered device 102 is likely (e.g., a user opens or otherwise interacts with an application as described above with reference to App6 in FIG. 1). As a result of the detected user input, the client device 140 transmits (304) a message (e.g., hint message 152, FIG. 1) that indicates one or more interactions with the battery-powered device 102 are likely. The server system 130 receives (306) the message and transmits a standby command to the battery-powered device 102 via an access point (as described above with reference to FIGS. 1 and 2A-2E). The battery-powered device 102 receives (308) the standby command (upon fetching the message from the access point in response to a DTIM beacon being received), and either increases the rate at which it checks DTIM beacons (as described above with reference to standby modes 204 and 205-2 in FIGS. 2B-2D), or enters a temporary high-power communication mode (as described above with reference to standby modes 205-1 and 207 in FIGS. 2D-2E). Regardless of the action taken at operation 308 (regardless of the standby mode timing parameters), other components of the battery-powered device 102 may remain in a low-power state (in a sleep mode). Subsequent to the user input detected at operation 302, the client device 140 receives (310) a user request requiring the client device 140 to interact with the battery-powered device 102 (e.g., a request for video and/or audio data), as described above with reference to request 154/164 in FIG. 1. The client device 140 transmits (312) the user request to the server system 130, which forwards (314) the user request to the battery-powered device 102. The battery-powered device 102 receives (316) the user request (while in the standby mode) upon receiving the next DTIM beacon (as described above with reference to FIGS. 2A-2E), and enters (318) a high-power usage state in order to act on the user request, which may involve transmitting requested data (e.g., data 166, FIG. 1) to the client device 140 via the server system 130. The server system 130 receives (320) the requested data and forwards it to the client device 140. The client device 140 receives (322) the data and optionally causes the data to be displayed (e.g., displays a live video stream provided by the battery-powered device 102).

Miscellaneous

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or workspace.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

In the following text some examples are described:

Example 1: A method, comprising:

operating a first device having at least one Wi-Fi transceiver in a power-saving Wi-Fi mode in which the first device repeatedly checks, at a first time interval, periodic delivery traffic indication message, DTIM, beacons transmitted at a second time interval by a wireless access point of a Wi-Fi network, the first time interval being longer than the second time interval;

receiving at the first device, during the power-saving Wi-Fi mode, a standby message; and in response to receiving the standby message operating the first device, during a first predefined time interval, in a standby mode in which the first device checks at a third time interval periodic DTIM beacons transmitted by the wireless access point, the third time interval being shorter than the first time interval.

Example 2: The method of example 1, wherein the standby mode comprises a first phase and a second phase, the first phase lasting a second predefined time interval shorter than the first predefined time interval, wherein the first device, during the first phase, operates in a reduced latency mode checking for information directly received from an access point of the Wi-Fi network, with no buffering and directed to the first device; and if no information is received in the first phase, operating the first device for the rest of first predefined time interval in the standby mode.

Example 3: The method of example 2, wherein the first device, during the first phase, is operated to receive information without having to wait for receipt of a DTIM beacon including an identifier of the first device; and the method further comprising existing the standby mode, if the first device receives information directly from the access point during the first phase.

Example 4: The method of example 2, wherein the second predefined time interval is in the range of 1.5 to 2.5 seconds, and, optionally, is two seconds.

Example 5: The method of example 2, wherein the second predefined time interval is in the range of 1 to 60 seconds.

Example 6: The method of any one of the preceding examples, further comprising:

when the first predefined time interval expires without the first device receiving a DTIM beacon including an identifier of the first device, exiting the standby mode and once again operating the first device in the power-saving Wi-Fi mode.

Example 7: The method of any one of the preceding examples, further comprising:

when the first device is operating in the standby mode and when the DTIM beacon includes an identifier of the first device, downloading by the first device buffered information directed to the first device, wherein the buffered information is buffered at an access point of the Wi-Fi network; and exiting the standby mode and operating the first device in a non-power saving mode, for directly receiving from an access point of the Wi-Fi network, with no buffering, information directed to the first device.

Example 8: The method of any one of the preceding examples, wherein the first device is a battery-powered device.

Example 9: The method of any one of the preceding examples, wherein the first device is a connected device including a camera, a lock, a doorbell, a light, a speaker, or a media streaming device.

Example 10: The method of any one of the preceding examples, wherein the first time interval is in the range of 0.5 to 1.5 seconds, and, optionally, is one second.

Example 11: The method of any one of claims 1 to 9, wherein the first time interval is 0.6 seconds.

Example 12: The method of any one of the preceding examples, wherein the second time interval is in the range of 150 to 250 milliseconds, and, optionally, is 200 milliseconds.

Example 13: The method of any one of the preceding examples, wherein the first predefined time interval is in the range of 15 to 40 seconds, and, optionally, is 30 seconds.

Example 14: The method of any one of claims 1 to 12, wherein the first predefined time interval is in the range of 1 to 60 seconds, and, optionally, is 30 seconds.

Example 15: A method, comprising:

prior to receiving, at a client device, a user request for video and/or audio data from a battery-powered camera device, at the client device:

detecting a first interaction with an application of the client device, the application configured to communicate with the battery-powered camera device via a Wi-Fi network;

in response to the detected first interaction, transmitting a hint message that indicates the detected first interaction to a server system in communication with the battery-powered camera device, the indication configured to cause the server system to transmit a standby message causing the battery-powered camera device to receive delivery traffic indication message, DTIM, beacons at an increased rate compared to a rate associated with a power-saving Wi-Fi mode of the battery-powered camera device;

receiving the user request for video and/or audio data from the battery-powered camera device;

transmitting the user request to the server system; and receiving the video and/or audio data from the server system.

Example 16: The method of example 15, wherein the detected first interaction is an intermediate step in requesting live video data, the intermediate step not including the actual request for the live video data.

Example 17: The method of example 15 or 16, wherein the battery-powered camera device, in the power-saving Wi-Fi mode repeatedly checks, at a first time interval, periodic DTIM beacons transmitted at a second time interval, and wherein the standby message causes the battery-powered camera device to adjust a DTIM beacon checking interval by, in response to receiving the standby message, operating the battery-powered camera device, during a first predefined time interval, in a standby mode in which the battery-powered camera device checks at a third time interval periodic DTIM beacons transmitted by a wireless access point, the third time interval being shorter than the first time interval.

Example 18: The method of any one of examples 15 to 17, wherein the user request causes the battery-powered camera device to wake from the power-saving Wi-Fi mode and transmit the requested video and/or audio data in accordance with the user request.

Example 19: The method of any one of examples 15 to 18, wherein the application is configured to communicate with a plurality of battery-powered camera devices via the server system, further comprising, in response to the detecting the first interaction, indicating in the hint message that the application is preparing transmissions directed to at least a subset of the plurality of the battery-powered camera devices.

Example 20: A Wi-Fi integrated circuit, comprising:

a Wi-Fi transceiver;

one or more processors; and memory storing instructions that, when executed by the one or more processors, causes the one or more processors to:

operate the Wi-Fi transceiver in a power-saving Wi-Fi mode in which the Wi-Fi transceiver repeatedly checks, at a first time interval, periodic delivery traffic indication message, DTIM, beacons transmitted at a second time interval by a wireless access point of a Wi-Fi network, the first time interval being longer than the second time interval;

receiving at the Wi-Fi transceiver, during the power-saving Wi-Fi mode, a standby message; and
in response to receiving the standby message operating the Wi-Fi transceiver, during a first predefined time interval, in a standby mode in which the Wi-Fi transceiver checks at a third time interval periodic DTIM beacons transmitted by the wireless access point, the third time interval being shorter than the first time interval.

Example 21: An apparatus, comprising:
one or more processors; and
memory storing instructions that, when executed by the one or more processors, causes the one or more processors to perform the method of any one of examples 1 to 19.

Example 22: An apparatus, comprising the Wi-Fi integrated circuit of example 20.

The invention claimed is:

1. A method, comprising:
operating a first device having at least one Wi-Fi transceiver in a power saving Wi-Fi mode in which the first device repeatedly checks, at a first time interval, periodic delivery traffic indication message (DTIM) beacons transmitted at a second time interval by a wireless access point of a Wi-Fi network, the first time interval being longer than the second time interval;
receiving at the first device, during the power saving Wi-Fi mode, a standby message;
in response to receiving the standby message operating the first device, during a first predefined time interval, in a standby mode in which the first device checks at a third time interval periodic DTIM beacons transmitted by the wireless access point, the third time interval being shorter than the first time interval;
when the first device is operating in the standby mode and when the DTIM beacon includes an identifier of the first device, downloading by the first device and from an access point of the Wi-Fi network, buffered information, buffered at the access point, and directed to the first device; and
exiting the standby mode and operating the first device in a non-power saving mode, for directly receiving information directed to the first device from an access point of the Wi-Fi network, without the information being buffered at the access point.

2. The method of claim 1, wherein the standby mode comprises a first phase and a second phase, the first phase lasting a second predefined time interval shorter than the first predefined time interval, wherein the first device, during the first phase, operates in a reduced latency mode checking for information directly received from an access point of the Wi-Fi network, with no buffering of the information at the access point and the information directed to the first device; and
if no information is received in the first phase, operating the first device for the rest of first predefined time interval in the standby mode.

3. The method of claim 2, wherein the first device, during the first phase, is operated to receive information without having to wait for receipt of a DTIM beacon including an identifier of the first device; and
the method further comprising existing the standby mode, if the first device receives information directly from the access point during the first phase.

4. The method of claim 2, wherein the second predefined time interval is in a range of 1.5 to 2.5 seconds, and, optionally, is two seconds.

5. The method of claim 1, further comprising:
when the first predefined time interval expires without the first device receiving a DTIM beacon including an identifier of the first device, exiting the standby mode and once again operating the first device in the power saving Wi-Fi mode.

6. The method of claim 1, wherein the first device is a battery-powered device.

7. The method of claim 1, wherein the first device is a connected device including a camera, a lock, a doorbell, a light, a speaker, or a media streaming device.

8. The method of claim 1, wherein the first time interval is in a range of 0.5 to 1.5 seconds, and, optionally, is one second.

9. The method of claim 1, wherein the second time interval is in a range of 150 to 250 milliseconds, and, optionally, is 200 milliseconds.

10. The method of claim 1, wherein the first predefined time interval is in a range of 15 to 40 seconds, and, optionally, is 30 seconds.

11. A Wi-Fi integrated circuit, comprising:
a Wi-Fi transceiver;
one or more processors; and
memory storing instructions that, when executed by the one or more processors, causes the one or more processors to:
operate the Wi-Fi transceiver in a power saving Wi-Fi mode in which the Wi-Fi transceiver repeatedly checks, at a first time interval, periodic delivery traffic indication message (DTIM) beacons transmitted at a second time interval by a wireless access point of a Wi-Fi network, the first time interval being longer than the second time interval;
receiving at the Wi-Fi transceiver, during the power saving Wi-Fi mode, a standby message;
in response to receiving the standby message operating the Wi-Fi transceiver, during a first predefined time interval, in a standby mode in which the Wi-Fi transceiver checks at a third time interval periodic DTIM beacons transmitted by the wireless access point, the third time interval being shorter than the first time interval;
when the Wi-Fi transceiver is operating in the standby mode and when the DTIM beacon includes an identifier of the Wi-Fi transceiver, download by the Wi-Fi transceiver and from an access point of the Wi-Fi network, buffered information, buffered at the access point, and directed to the Wi-Fi transceiver; and
exit the standby mode and operate the Wi-Fi transceiver in a non-power saving mode, to directly receive information directed to the Wi-Fi transceiver from an access point of the Wi-Fi network, without the information being buffered at the access point.

12. The Wi-Fi integrated circuit of claim 11, the instructions further executable to cause the one or more processors to:
when the first predefined time interval expires without the Wi-Fi transceiver receiving a DTIM beacon including an identifier of the Wi-Fi transceiver, exit the standby mode and once again operating the Wi-Fi transceiver in the power saving Wi-Fi mode.

13. An apparatus, comprising:
at least one Wi-Fi transceiver;
one or more processors; and
memory storing instructions that, when executed by the one or more processors, causes the one or more processors to:

operate in a power saving Wi-Fi mode in which the apparatus repeatedly checks, at a first time interval, periodic delivery traffic indication message (DTIM) beacons transmitted at a second time interval by a wireless access point of a Wi-Fi network, the first time interval being longer than the second time interval;

receive, during the power saving Wi-Fi mode, a standby message; and in response to receiving the standby message, operate, during a first predefined time interval, in a standby mode in which the apparatus checks at a third time interval periodic DTIM beacons transmitted by the wireless access point, the third time interval being shorter than the first time interval;

when the apparatus is operating in the standby mode and when the DTIM beacon includes an identifier of the apparatus, download by the apparatus and from an access point of the Wi-Fi network, buffered information, buffered at the access point, and directed to the apparatus; and exit the standby mode and operate the apparatus in a non-power saving mode, to directly receive information directed to the apparatus from an access point of the Wi-Fi network, without the information being buffered at the access point.

14. The apparatus of claim 13, wherein the standby mode comprises a first phase and a second phase, the first phase lasting a second predefined time interval shorter than the first predefined time interval, wherein the apparatus, during the first phase, operates in a reduced latency mode checking for information directly received from an access point of the Wi-Fi network, with no buffering of the information at the access point and the information directed to the apparatus; and if no information is received in the first phase, the apparatus operates for the rest of first predefined time interval in the standby mode.

15. The apparatus of claim 14, wherein during the first phase, the apparatus receives information without having to wait for receipt of a DTIM beacon including an identifier of the apparatus; and the instructions are further executable by the one or more processors to:

exit the standby mode, if the apparatus receives information directly from the access point during the first phase.

16. The apparatus of claim 14, wherein the second predefined time interval is in a range of 1.5 to 2.5 seconds, and, optionally, is two seconds.

17. The apparatus of claim 13, the instructions further executable to cause the one or more processors to:

when the first predefined time interval expires without the apparatus receiving a DTIM beacon including an identifier of the apparatus, exit the standby mode and once again operating the apparatus in the power saving Wi-Fi mode.

18. The apparatus of claim 13, wherein the apparatus is a battery-powered device.

19. The apparatus of claim 13, wherein the apparatus is a connected device including a camera, a lock, a doorbell, a light, a speaker, or a media streaming device.

20. The apparatus of claim 13, wherein the first time interval is in a range of 0.5 to 1.5 seconds, and, optionally, is one second, wherein the second time interval is in a range of 150 to 250 milliseconds, and, optionally, is 200 milliseconds, and wherein the first predefined time interval is in a range of 15 to 40 seconds, and, optionally, is 30 seconds.

* * * * *